US 7,706,470 B2

United States Patent
Chuang et al.

(10) Patent No.: US 7,706,470 B2
(45) Date of Patent: Apr. 27, 2010

(54) ACQUISITION METHOD FOR GLOBAL POSITIONING SYSTEM

(75) Inventors: Ming-Yu Chuang, Taichung (TW); Kai-Ten Feng, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 680 days.

(21) Appl. No.: 11/619,631

(22) Filed: Jan. 4, 2007

(65) Prior Publication Data

US 2007/0242776 A1   Oct. 18, 2007

Related U.S. Application Data

(60) Provisional application No. 60/756,779, filed on Jan. 6, 2006.

(51) Int. Cl.
*H04L 27/06* (2006.01)
*H04B 1/69* (2006.01)
(52) U.S. Cl. ...................... 375/316; 375/130
(58) Field of Classification Search ............... 375/316, 375/130, 149, 134, 340; 370/515; 342/356, 342/357.06, 357.08, 375.12
See application file for complete search history.

(56) References Cited

U.S. PATENT DOCUMENTS 7,248,624 B2 * 7/2007 Tang ..................... 375/149

2007/0205940 A1 * 9/2007 Yang et al. ............. 342/357.12

OTHER PUBLICATIONS

"GPS Receiver Architectures and Measurements" Braasch, et al., Jan. 1999, pp. 48-64.
"Acquisition of GPS C/A Code Signals" James Bao-Yen Tsui, 2000, pp. 133-164.
"New Fast GPS Code-Acquisition Technique Using FF" Electronics Letters Jan. 17, 1991, pp. 158-160.
"GPS Receiver Search Techniques" Phillip W. Ward, 1996, pp. 604-611.
"Averaging Correlation for C/A Code Acquisition and Tracking in Frequency Domain" Starzyk et al., 2001, pp. 905-908.
"Improved Search Algorithm for Fast Acquisition in a DSP-based GPS Receiver" Daffara et al., 1998, pp. 310-314.
"Understanding the Indoor GPS Signal" Haddrell, et al., Sep. 2001, pp. 1487-1499.
"Process for Improving GPS Acquisition Assistance Data and Server-Side Location Determination for Cellular Networks" Harper et al., Dec. 2004.

(Continued)

*Primary Examiner*—Khai Tran
(74) *Attorney, Agent, or Firm*—Thomas, Kayden, Horstemeyer & Risley

(57) ABSTRACT

A Global Positioning System (GPS) acquisition method is provided. A GPS signal is first received, comprising a plurality of data bits, each repeating for a bit period. A search space is then formed, comprising a plurality of elements each associated with a presumed offset and a presumed code phase. Before bit-transition of each bit period, element values of the elements are accumulated by substituting the data bits into a coherent-combination algorithm. After bit-transition of each bit period, the element values are accumulated by substituting the data bits into a differential-coherent combination algorithm.

12 Claims, 7 Drawing Sheets

OTHER PUBLICATIONS

"Analysis of a Software-based A-GPS Acquisition Performance Using Statistical Processes" Kubrak et al., Jan. 2005, pp. 1082-1092.

"Block Acquisition of Weak GPS Signals in a Software Receiver" Mark L. Psiaki, Sep. 2001, pp. 2838-2850.

"Diffierentially Coherent Combining Double-Dwell Code Acquisition in DS-CDMA Systems" Shin et al., 2003, pp. 1046-1050.

"An Assisted GPS Acquisition Method Using L2 Civil Signal in Weak Signal Environment" Cho et al., Nov. 2004, pp. 25-31.

"Efficient Differentially Coherent Code/Doppler Acquisition of Weak GPS Signals" Elders-Boll, et al., 2004, pp. 731-735.

"A Software GPS Receiver for Weak Signals" Lin et al., 2001, pp. 2139-2142.

* cited by examiner

ACQUISITION METHOD FOR GLOBAL POSITIONING SYSTEM

CROSS REFERENCE TO RELATED APPILCATIONS

This application claims the benefit of U.S. Provisional Application No. 60/756,779, filed Jan. 6, 2006.

BACKGROUND OF THE INVENTION

1. Field of the Invention

The invention relates to a Global Positioning System, and in particular, to a GPS acquisition method for use in weak signal environments.

2. Description of the Related Art

FIG. 1 shows a sequence of data bits with bit-transition. In a Global Positioning System (GPS) receiver, transmission signals are demodulated and digitized into a sequence of data bits. According to GPS L2 civil signal standard, a bit value sustains for a period, such as 20 ms for L2 civil moderate (CM) maximal length code. Bit transition may therefore occur every 20 ms. Pseudo-random number (PRN) codes and carrier signals sent from several GPS satellites must be acquired and tracked for use. A typical receiver channel operates in two modes: acquisition and tracking. In acquisition mode, PRN code phase (measured by start time of the PRN code) and carrier Doppler offset are estimated via a search process. The estimated quantities are then used and continuously updated in tracking mode.

FIG. 2 shows a search space m(n) formed by presumed code phases and presumed offsets. A received GPS signal is typically defined as follows:

$$r(t) = \sqrt{A} \cdot N(t) \cdot s(t-\tau) \cdot e^{j2\pi f_d t} + n(t) \quad (1)$$

The parameter A represents the power of the received GPS signal. N(t) denotes a navigation bit value at time t. Each bit value has a span (bit period) of 20 ms. $\tau$ is an unknown code phase to be determined. $f_d$ is an unknown Doppler offset value in KHz. n(t) is an assumed additive white Gaussian noise (AWGN).

If the received GPS signal r(t) is digitized at a 5 MHz sample rate, 5000 samples are available per 1 ms. For most applications, frequency range of the received signal with Doppler offset falls within ±10 KHz with respect to a center frequency 1250 KHz. To simplify the search for Doppler offset value, the frequency range is coarsely sliced into 21 presumed values, −10 to 10 KHz with a step size of 1 KHz. The search space m(n) is therefore formed to determine the unknown code phase and the unknown Doppler offset value forcibly:

$$m(n) = \{y_{i,j}(n) | i,j \in R, 1 \leq i \leq p, 1 \leq j \leq q\} \quad (2)$$

The parameter n denotes an $n^{th}$ bit period, and the $n^{th}$ search space m(n) comprises p*q elements where the amount of possible code phases p is 5000, and the amount of possible offset values q is 21. $y_{i,j}(n)$ is a correlation value corresponding to an ($i^{th}$, $j^{th}$) element calculated per code time:

$$y_{i,j}(n) = \int_{(n-i)T}^{nT} r(t)s(t-\tau_i) \cdot e^{j2\pi f_j t} dt \quad (3)$$

The parameter T represents the code time (1 ms for this case). $\tau_i$ is the $i^{th}$ presumed code phase, and $f_j$ is the $j^{th}$ presumed offset. A total of 5000*21 correlation values are simultaneously calculated within 1 ms, and a peak can be found, with corresponding code phase and offset value thereof used as the acquisition result.

In high SNR situations (e.g. outdoors or in rural areas), the 1-ms correlation is generally satisfactory for detecting code phase and Doppler offset. For weak signal environments (low SNR situation), however, the correlation results $y_{i,j}(n)$ are typically accumulated for multiple periods before selection of a peak as an answer, such that possibility of false detection is reduced. Various conventional accumulation algorithms are readily presented, such as coherent combination (CC), non-coherent combination (NCC) and differential-coherent combination (DCC).

FIG. 3 shows an integral calculated by a conventional coherent combination algorithm. The coherent combination algorithm is presented as:

$$P_{CC}^N = \max\left\{\left|\sum_{n=1}^{N} y_{i,j}(n)\right|^2\right\} \quad (4)$$

Correlation values $y_{i,j}(n)$ corresponding to the ($i^{th}$, $j^{th}$) element are accumulated for consecutive code times 1 to N, and their sums squared before selection of a peak therefrom. The coherent combination algorithm provides excellent accuracy for peak detection without squaring loss. As a result of the navigation bit-transition periodically occurring as shown in FIG. 1, however, the integral may be deteriorated. As shown in FIG. 3, a coherent combination integral of a ($i^{th}$, $j^{th}$) element in the search space is also referred to as an element value of a corresponding correlation value $y_{i,j}(n)$. The horizontal axis denotes the integration time N (the unit is referred to as code time). The element value grows before the bit-transition occurring at N=10 and 30, and decreases thereafter due to a cancellation effect induced by complex number operations in formula (3). As seen, the element value cannot effectively increase to distinguish a peak from noise.

The non-coherent combination algorithm is denoted as follows:

$$P_{NCC}^N = \max\left\{\sum_{n=1}^{N} |y_{i,j}(n)|^2\right\} \quad (5)$$

Based on the non-coherent combination (NCC) algorithm, absolute values are taken before summation, alleviating the bit-transition cancellation problem. As SNR decreases, however, an element value calculated from the non-coherent combination algorithm may suffer from squaring loss, making it impractical for weak signal environment. Therefore, a more flexible combination scheme is desirable in GPS acquisition.

BRIEF SUMMARY OF THE INVENTION

An exemplary embodiment of a Global Positioning System (GPS) acquisition method is provided. A GPS signal is first received, comprising a plurality of data bits, each repeated for a bit period. A search space is then formed, comprising a plurality of elements each associated with a presumed offset and a presumed code phase. Before bit-transition of each bit period, element values of the elements are accumulated by substituting the data bits into a coherent-combination algorithm. After bit-transition of each bit period, the element values are accumulated by substituting the data bits into a differential-coherent combination algorithm.

The search space may be partitioned into a plurality of sub-spaces. Signal to noise ratio (SNR) of the GPS signal is further estimated.

When accumulating the element values before and after the bit-transition, correlations of the data bits with each presumed offset and presumed code phase in the search space are forcibly calculated to generate a plurality of correlation values. Element values for each element are accumulated in the search space respectively with integrals of corresponding correlation values calculated by either the coherent or differential-coherent combination algorithm.

The coherent combination algorithm contributes to an element value of an element by squaring a sum of consecutive correlation values corresponding to the element within a period of code times. The differential-coherent combination algorithm contributes to an element value of an element by multiplying a current correlation value with a previous correlation value corresponding to the element for each code time, and summing the multiplications as a result that contributes to the element value.

Among the element values, a peak is detected based on a SNR dependent peak threshold. When the peak is detected, a presumed offset and a presumed code phase associated with the peak are reported as an acquisition result.

When detecting the peak, a largest value and a second largest value are found among the element values. A ratio of the largest to the second large values is calculated. If the ratio exceeds the peak threshold, the largest value is confirmed as the peak.

Bit-transitions of each bit period are detected using a SNR dependent bit-transition threshold. The bit-transition detection of each bit period comprises performing a forward accumulation using the coherent combination algorithm to obtain a first value and a second value corresponding to two consecutive code times within the bit period, wherein the first value is prior to the second value. A ratio of the first to second values is calculated. The ratio is compared with the bit-transition threshold. If the ratio exceeds the bit-transition threshold, bit-transition is confirmed at the code time corresponding to the second value. Likewise, a backward accumulation is performed to optimize bit-transition detection for later half of the bit period.

The bit period is 20 ms, and the code time is 1 ms. The amount of presumed offsets is 21, ranging from −10 KHz to +10 KHz with a step size 1 KHz. The amount of presumed code phases is 5000. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Another conventional combination scheme is differential-coherent combination algorithm, denoted as follows:

$$P_{DCC}^{N} = \max\left\{\left|\sum_{n=1}^{N} y_{i,j}(n-1) \cdot y_{i,j}(n)\right|\right\} \quad (6)$$

As shown in formula (6), correlation values of two consecutive search spaces are multiplied. In this way, the element value is not affected by either bit-transition or squaring loss, demonstrating a preferable solution. Even though differential-coherent combination avoids such issues, its accumulation efficiency is still less than coherent combination. Thus, an adaptive method taking both advantages from coherent and differential-coherent combinations, is proposed.

As an example for description, 20 code times are considered as one bit period, with each equivalent to 1 ms in the embodiment. Element values in a search space are individually accumulated for a plurality of code times (may be more than one bit period) in weak signal situations. Bit transition may occur at any position within a bit period. In the invention, correlation values before the bit-transition are accumulated using coherent combination algorithm, and those after the bit-transition are accumulated using differential-coherent combination algorithm.

Figure 2:
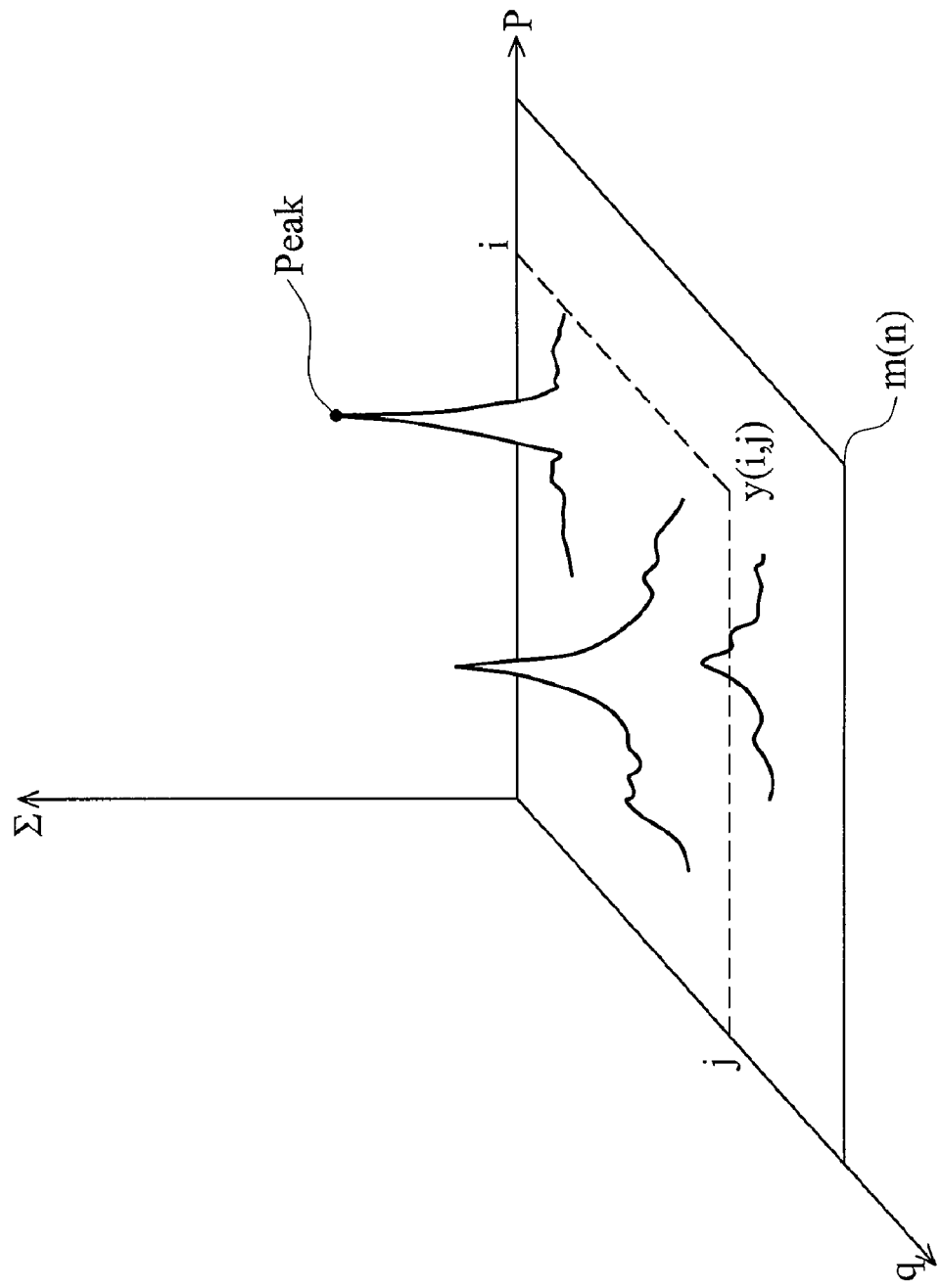
FIG. 2 shows a search space formed by presumed code phases and presumed offsets.
Figure 3:
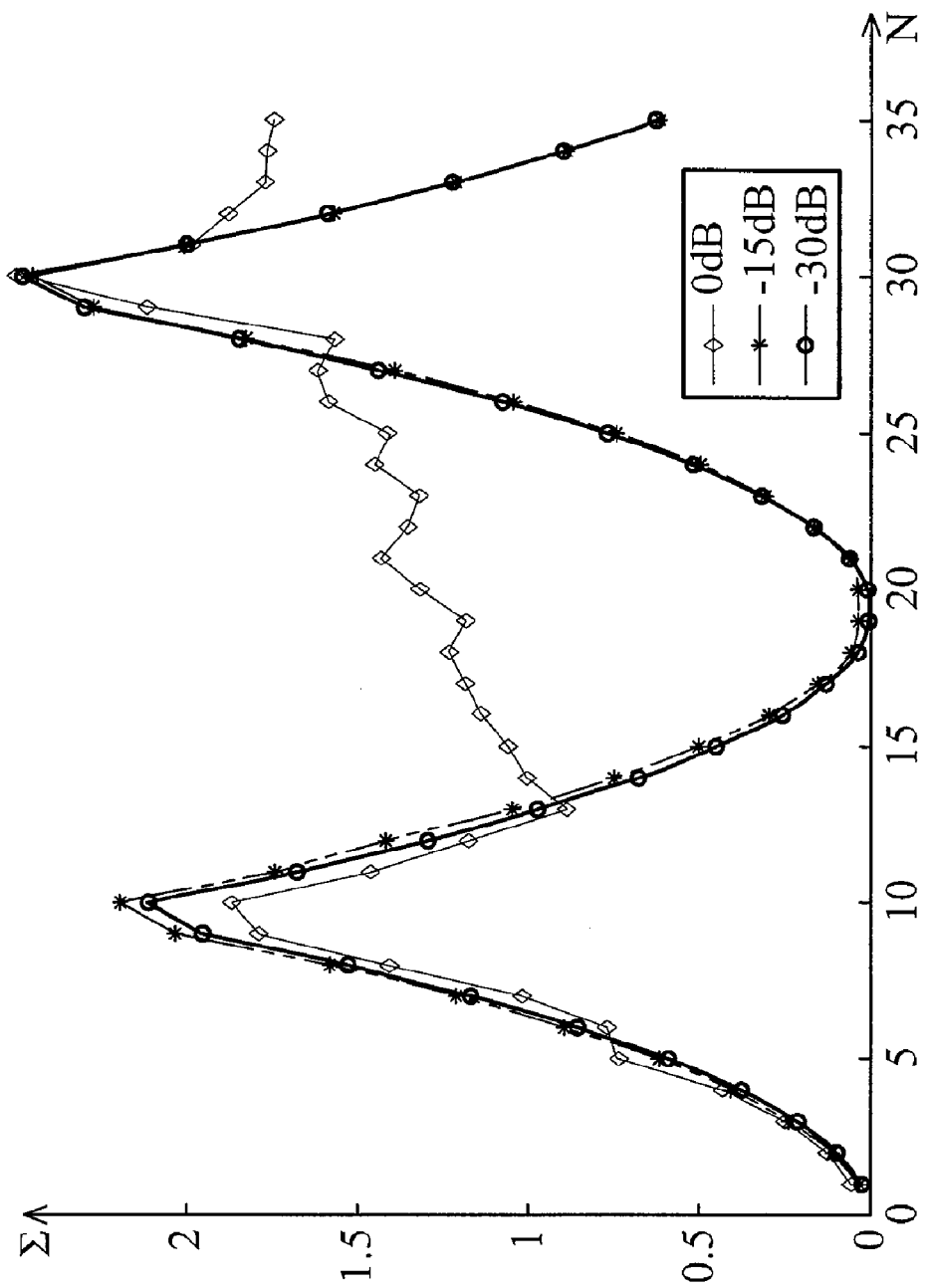
FIG. 3 shows an integral calculated by a conventional coherent combination algorithm.

For a search space m(n) as shown in FIG. 2, every single element in the search space is associated with a code phase i and an offset value j. Thus, i*j correlation values $y_{i,j}(n)$ are forcibly calculated every code time. Coherent combination or differential-coherent combination algorithms are selectively used to increase the corresponding element values. The forced search is recursively conducted until one element value is determined to be a peak value according to an SNR dependent peak threshold.

The integral increased by coherent combination can be represented as follows:

$$P_{CC}(i,j)_{\alpha}^{\beta} = \left|\sum_{n=\alpha}^{\beta} y_{i,j}(n)\right|^2 \quad (7)$$

where i denotes $i^{th}$ presumed code phase, j denotes $j^{th}$ presumed offset value, and $\alpha$ and $\beta$ are starting and terminating code time indices for integration. The correlation value $y_{i,j}(n)$ is calculated from a received data bit with the $j^{th}$ presumed offset and the $i^{th}$ presumed code phase at an $n^{th}$ code time based on formula (3). Specifically, the output of formula (7) indicates a square of sums of correlation values $y_{i,j}(n)$ corresponding to a $(i^{th}, j^{th})$ element in the search space, integrated from code times $\alpha$ to $\beta$.

Likewise, the integral increased by differential-coherent combination is expressed as:

$$P_{DCC}(i,j)_\alpha^\beta = \sum_{n=\alpha}^{\beta} |y_{i,j}(n-1) \cdot y_{i,j}(n)| \qquad (8)$$

In which correlation values of two consecutive code times are multiplied, absolutized and summed. Based on the aforementioned formulae, an element value contributed by the integrals of coherent combination and differential-coherent combination is expressed in a general form:

$$P_{ACC}(i,j)^N = \sum_{k=1}^{n-1} \{ P_{CC}(i,j)_{20(k-1)}^{20(k-1)+\lambda_k} + P_{DCC}(i,j)_{20(k-1)+\lambda_k+1}^{20k} \} + P_{CC}(i,j)_{20(n-1)}^{20(n-1)+\lambda_n} + P_{DCC}(i,j)_{20(n-1)+\lambda_n+1}^{20n} \qquad (9)$$

A $N^{th}$ element value is a summation of coherent combination and differential-coherent combination integrals increased from code times 1 to N. This duration may comprise (n−1) complete bit periods, and residual code times in the $n^{th}$ bit period. $\lambda_k$ denotes position of bit-transition in $k^{th}$ bit period. Formula (9) shows coherent combination integrals counted before bit-transition, and, conversely, after bit-transition, differential-coherent combination integrals are counted.

Figure 4:
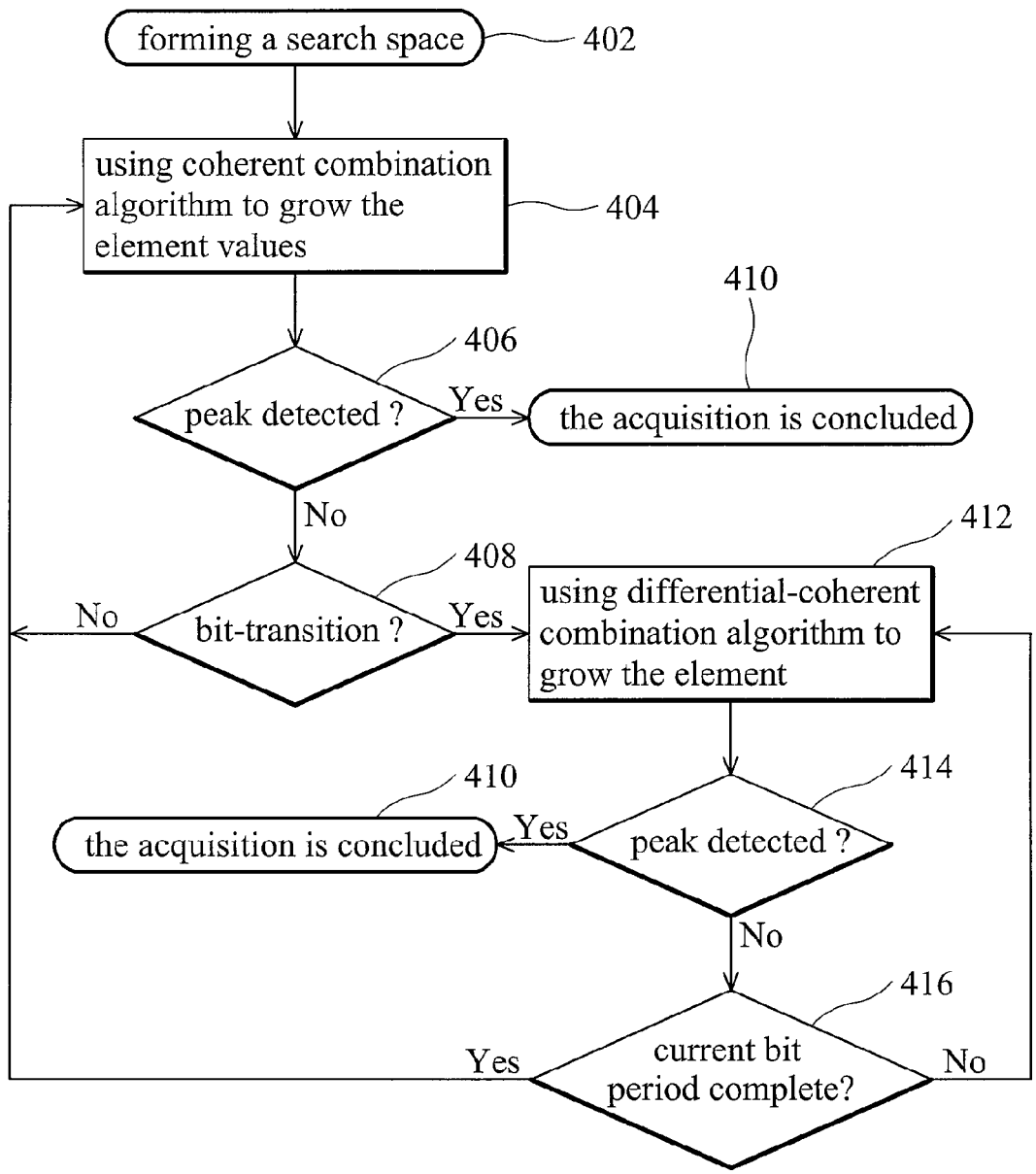
FIG. 4 is a flowchart of an embodiment of the adaptive GPS acquisition method.

FIG. 4 is a flowchart of an adaptive GPS acquisition method according to the invention. The aforementioned concepts can be concluded into the following executive steps. In step 402, GPS signals are recursively received and demodulated into a data bit stream, and a search space is formed to forcibly observe correlations of every data bit with all possible offset values and code phases. In step 404, a coherent combination algorithm is used to increase the element values in the search space. In step 406, it is determined whether a peak exists among the element values. If so, the acquisition is concluded in step 410, and a presumed offset and a presumed code phase associated with that element value is output as the acquisition result. In step 408, occurrence of bit-transition is checked. If no bit-transition is detected for the current code time, the process returns to step 404, and increase continues of element values with coherent combination algorithm. If bit-transition is detected in step 408, the differential-coherent combination algorithm is used rather than the coherent combination to increase the element values in step 412. Likewise, step 414 determines the peak. If detected, step 410 is executed. In step 416, it is determined whether the current bit period is complete. If not, the process returns to step 412, continuing increase of element values using differential-coherent combination algorithm. If the bit period is complete, the process goes to step 404, returning to coherent combination for next bit period.

Figure 5:
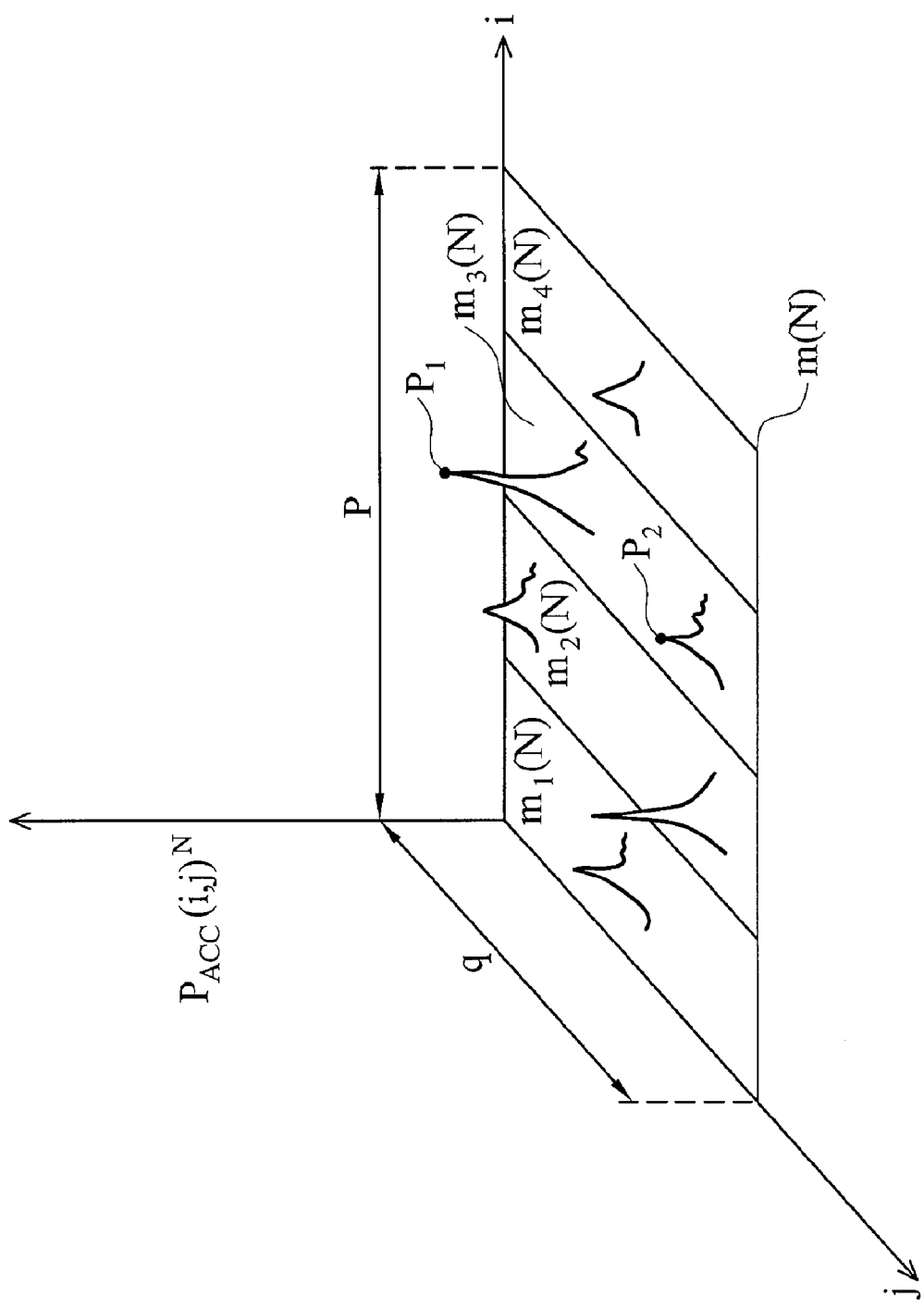
FIG. 5 shows an embodiment of the search space.

FIG. 5 shows an embodiment of the search space m(N) and peak detection. For each code time, a total of p*q element values are obtained, each associated with a presumed code phase i and offset value j. At the $N^{th}$ code time, element values $P_{ACC}(i,j)^N$ are shown in FIG. 5, increased with varying heights. Among the element values in the search space m(N), a peak is detected according to the following formula:

$$\frac{\max_{m(N)}\{P_{ACC}(i,j)_1^N\}}{\max^{2nd}_{m(N)}\{P_{ACC}(i,j)_1^N\}} > TH_P \qquad (10)$$

The upper part represents a maximum element value among the search space m(N), and the lower part a second large element value. The ratio is compared against the parameter $TH_P$, a peak threshold. More specifically, the peak threshold $TH_P$ may be a flexibly adjusted value dependent on SNR of the GPS signal. The SNR can be estimated by considering the standard deviation of the received GPS signal with surrounding noise, which is assumed to be a known technique. The peak threshold $TH_P$ may increase as the SNR increases, and decreases reversely. If the ratio exceeds the peak threshold $TH_P$, indicating a distinct peak obtained from the growing process, it is confirmed to be the correct acquisition result.

Alternatively, the search space m(N) may be partitioned into a plurality of sub-spaces, such as $m_1(N)$, $m_2(N)$ ... $M_L(N)$, and the total of code phases p equally divided by L. Thus, each sub-space comprises L*q elements. The peak detection can be individually processed in each subspace, by which the performance enhancement is significant. Formula (10) is therefore rewritten to described this case:

$$\frac{\max_{m_l(N)}\{P_{ACC}(i,j)_1^N\}}{\max^{2nd}_{m_l(N)}\{P_{ACC}(i,j)_1^N\}} > TH_P, \quad l = 1, 2, 3, \ldots, L \qquad (11)$$

Figure 1:
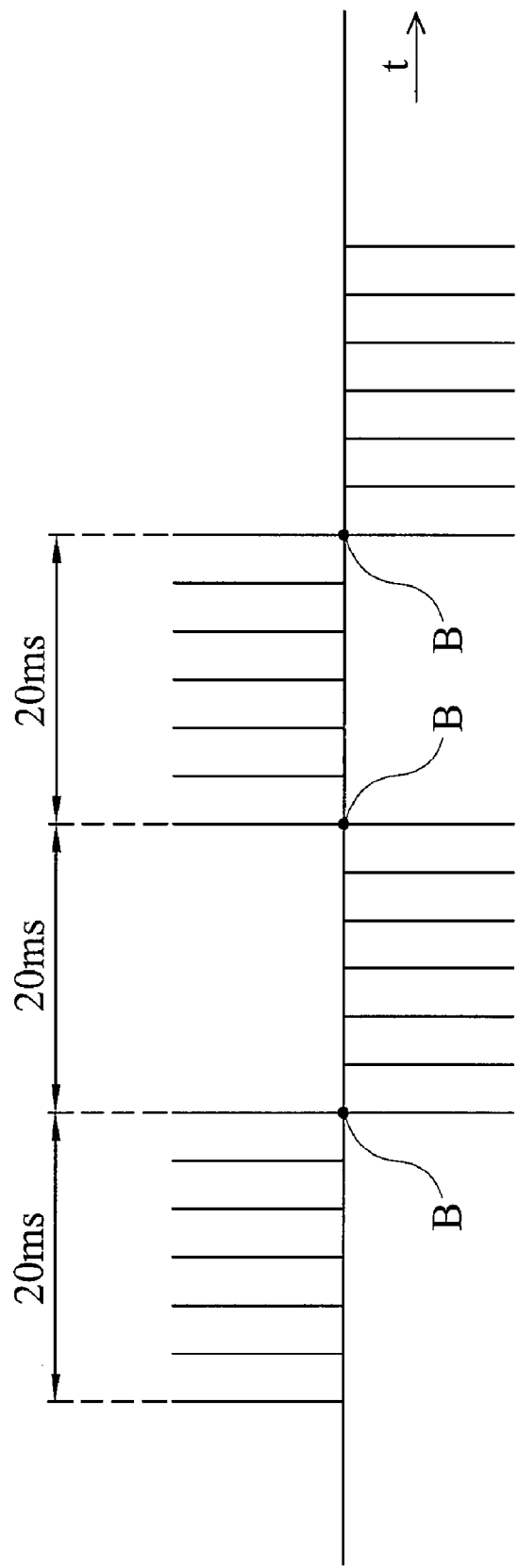
FIG. 1 shows a sequence of data bits with bit-transition.
Figure 6:
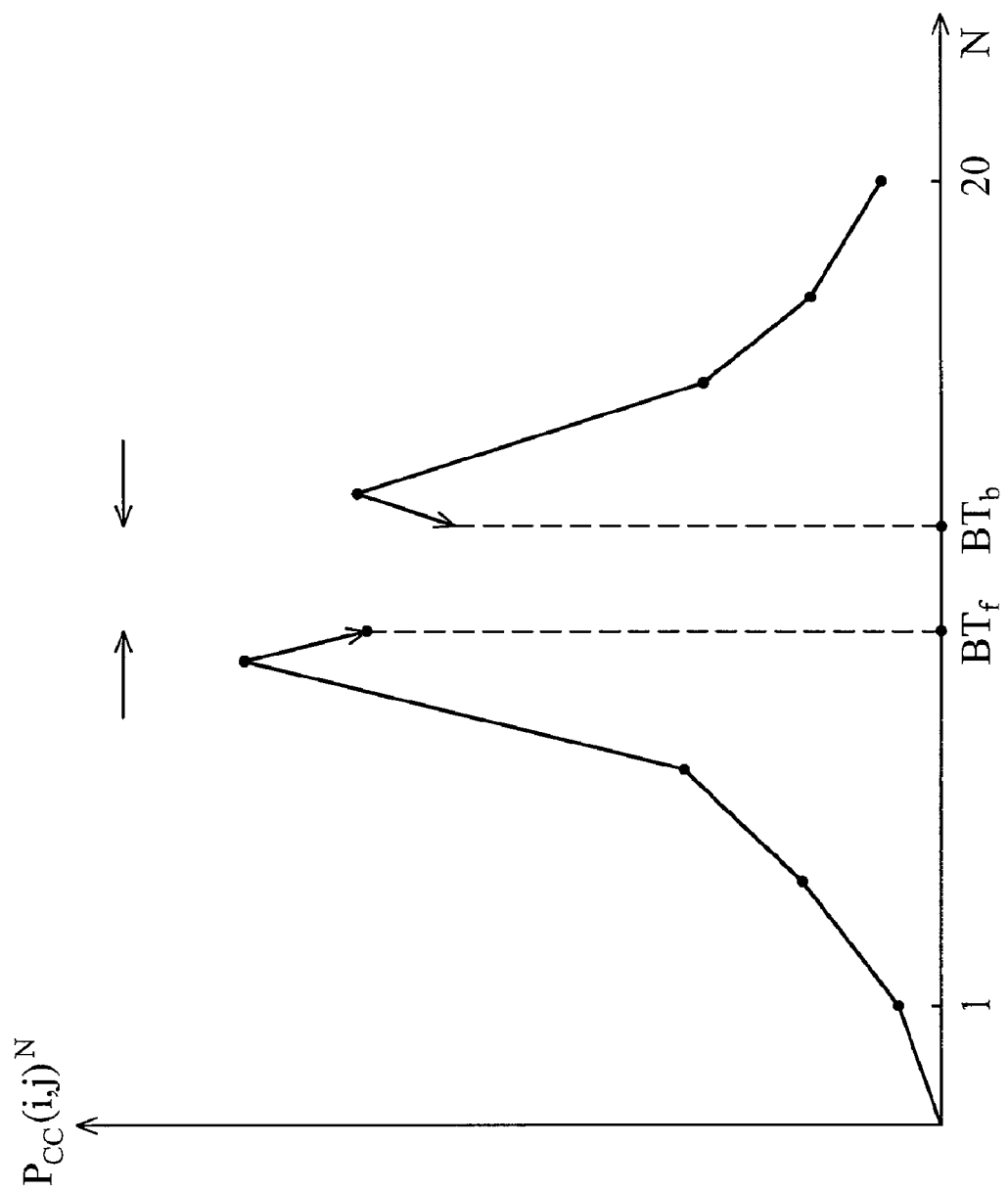
FIG. 6 shows an embodiment of bit-transition detection.

As shown in FIG. 1, at most one bit-transition may occur every 20 ms. Period boundaries on a receiver may not necessarily meet those of the data bit stream, thus positions of the bit-transition are uncertain for the receiver. FIG. 6 shows an embodiment of bit-transition detection. A forward detection and a backward detection are simultaneously executed. In the forward detection, a ratio of two consecutive coherent combination integrals is calculated and compared with a bit-transition threshold $TH_B$:

$$\frac{P_{CC}(i,j)_1^{N-1}}{P_{CC}(i,j)_1^N} > TH_B \qquad (12)$$

where N is a value between 1 and 20. As the element value incrementally grows using coherent combination algorithm, the occurrence of bit-transition inevitably causes a sudden sink as the code time $BT_f$ shown in FIG. 6. Thus, when the ratio of formula (12) exceeds the bit-transition threshold $TH_B$, the occurrence of bit-transition is confirmed.

Likewise, in a backward detection, a ratio is calculated as follows:

$$\frac{P_{CC}(i,j)_{20-N}^{20}}{P_{CC}(i,j)_{21-N}^{20}} > TH_B \qquad (13)$$

In which the integration is processed backward from the $20^{th}$ code time to the $(20-N)^{th}$ code time. A significant sink may also be found at the code time $BT_b$. Theoretically, the forward and backward detection will obtain the same bit-transition point, however, the forward detection is efficient for first half of the bit period (1 ms to 10 ms) while the backward detection is feasible for the later half (11 ms to 20 ms). Simultaneously performing both directions can significantly increase the performance. As another example, the bit-transition threshold $TH_B$ is also designed to be a programmable value dependent on SNR.

Alternatively, the bit-transition detection can be individually processed in each of the subspaces $m_1(N), m_2(N) \ldots M_L(N)$. The $(i^{th}, j^{th})$ element value used to calculate the coherent combination integral may be chosen from any local maximums in the subspaces.

Figure 7:
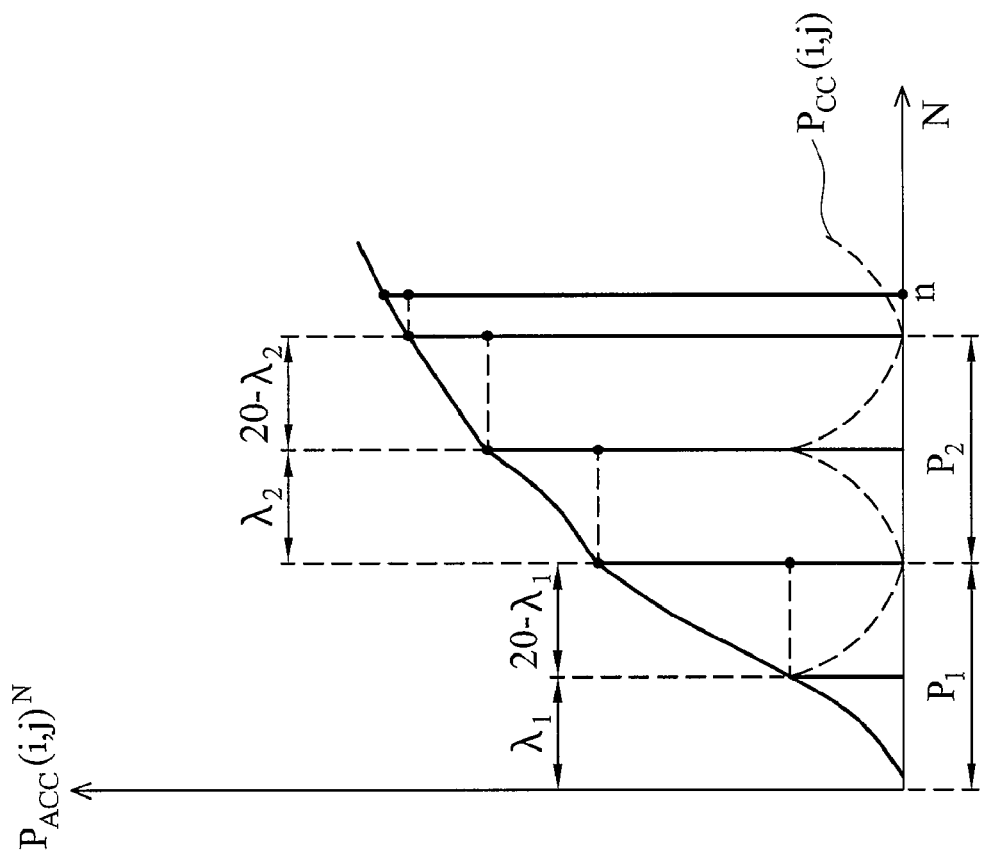
FIG. 7 shows an embodiment of the accumulation of an element value.

FIG. 7 shows an embodiment of the accumulation of an element value. An $(i^{th}, j^{th})$ element is assumed to be the correct acquisition result, and its growing process is specifically described for best understanding. The horizontal axis is code time N, and the vertical axis is the accumulated element value calculated by formula (9). The doted line below shows a comparative value accumulated using coherent combination algorithm. The ultimate element value obtained at code time N is:

$$P_{ACC}(i,j)^N = P_{CC}(i,j)_1^{\lambda_1} + P_{DCC}(i,j)_{\lambda_1+1}^{20} + P_{CC}(i,j)_{21}^{21+\lambda_2} + P_{DCC}(i,j)_{22+\lambda_2}^{40} + P_{CC}(i,j)_{41}^N \quad (14)$$

It can be seen that the accumulation result is relatively efficient in comparison to the conventional coherent combination algorithm. In the embodiment, the bit period is 20 ms, and the code time is 1 ms. The amount of presumed offsets is 21, ranging from −10 KHz to +10 KHz with a step size 1 KHz, and the amount of presumed code phases is 5000. However, these values can be varied for different applications. The GPS acquisition method may be implemented in software or in a DSP-based GPS receiver. While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Global Positioning System (GPS) acquisition method implemented in a GPS receiver for acquiring offset and code phase of signals, comprising:
   receiving by the GPS receiver a GPS signal comprising a plurality of data bits from a GPS satellite, each repeating for a bit period;
   forming in the GPS receiver a search space comprising a plurality of elements each corresponding to a presumed offset and a presumed code phase;
   before bit-transition of each bit period, accumulating in the GPS receiver element values of the elements by substituting the data bits into a coherent-combination algorithm;
   after bit-transition of each bit period, accumulating in the GPS receiver the element values by substituting the data bits into a differential-coherent combination algorithm; and
   determine whether the presumed offset and the presumed code phase is output as the acquisition result according to the accumulated element values.

2. The GPS acquisition method as claimed in claim 1, wherein formation of the search space comprises:
   partitioning the search space into a plurality of sub-spaces; and
   forcibly calculating correlations of the data bits with each pair of presumed offset and presumed code phase in the sub-spaces.

3. The GPS acquisition method as claimed in claim 1, further comprising estimating signal to noise ratio (SNR) of the GPS signal.

4. The GPS acquisition method as claimed in claim 3, wherein accumulation of the element values before and after the bit-transition comprises: forcibly calculating correlations of the data bits with each presumed offset and presumed code phase in the search space to generate a plurality of correlation values; and
   accumulating element values for each element in the search space respectively with integrals of corresponding correlation values calculated by either the coherent or differential-coherent combination algorithm.

5. The GPS acquisition method as claimed in claim 4, wherein the coherent combination algorithm contributes to an element value of an element by squaring a sum of consecutive correlation values corresponding to the element within a period of code times.

6. The GPS acquisition method as claimed in claim 4, wherein the differential-coherent combination algorithm contributes to an element value of an element by:
   within a period of code times, multiplying a current correlation value with a previous correlation value corresponding to the element for each code time; and
   summing the multiplications as a result that contributes to the element value.

7. The GPS acquisition method as claimed in claim 3, further comprising:
   detecting a peak among the element values based on a SNR dependent peak threshold; and
   when a peak is detected, a presumed offset and a presumed code phase corresponding to the peak is reported as an acquisition result.

8. The GPS acquisition method as claimed in claim 7, wherein the peak detection comprises:
   finding a largest value among the element values;
   finding a second largest value among the element values;
   calculating a ratio of the largest to the second largest values; and
   if the ratio exceeds the peak threshold, confirming the largest value as the peak, otherwise detecting no peak, and the accumulation of the search space is recursively conducted.

9. The GPS acquisition method as claimed in claim 2, further comprising detecting bit-transitions of each bit period using a SNR dependent bit-transition threshold.

10. The GPS acquisition method as claimed in claim 9, wherein the bit-transition detection of each bit period comprises:
   performing a forward accumulation using the coherent combination algorithm to obtain a first value and a second value corresponding to two consecutive code times within the bit period, wherein the first value is prior to the second value;
   calculating a ratio of the first to second values; and
   comparing the ratio with the bit-transition threshold; wherein if the ratio exceeds the bit-transition threshold, the occurrence of bit-transition is confirmed at the code time corresponding to the second value.

11. The GPS acquisition method as claimed in claim 9, wherein the bit-transition detection of each bit period comprises:

performing a backward accumulation using the coherent combination algorithm to obtain a first value and a second value corresponding to two consecutive code times within the bit period, wherein the first value is successive to the second value;

calculating a ratio of the second to first values; and comparing the ratio with the bit-transition threshold;

wherein if the ratio exceeds the bit-transition threshold, the occurrence of bit-transition is confirmed at the code time corresponding to the first value.

12. The GPS acquisition method as claimed in claim 1, wherein:

the bit period is 20 ms, and the code time is 1 ms;

the amount of presumed offsets is 21, ranging from −10 KHz to +10 KHz with a step size 1 KHz;

the amount of presumed code phases is 5000.

\* \* \* \* \*